United States Patent
Lee

(10) Patent No.: US 8,471,832 B2
(45) Date of Patent: Jun. 25, 2013

(54) KEYPAD ASSEMBLY HAVING LIGHT LEAKAGE PREVENTION STRUCTURE

(75) Inventor: Joo-Hoon Lee, Yongin-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1026 days.

(21) Appl. No.: 11/825,425

(22) Filed: Jul. 6, 2007

(65) Prior Publication Data

US 2008/0211776 A1 Sep. 4, 2008

(30) Foreign Application Priority Data

Mar. 2, 2007 (KR) .......................... 10-2007-0021184

(51) Int. Cl.
*G06F 3/042* (2006.01)

(52) U.S. Cl.
USPC .......................................................... 345/176

(58) Field of Classification Search
USPC .............. 345/156, 168, 169–172; 341/21–23; 200/237, 308, 310
See application file for complete search history.

(56) References Cited

U.S. PATENT DOCUMENTS

| | | | | |
|---|---|---|---|---|
| 5,661,279 A | * | 8/1997 | Kenmochi | 200/314 |
| 5,975,711 A | * | 11/1999 | Parker et al. | 362/24 |
| 2004/0028895 A1 | * | 2/2004 | Yamakami et al. | 428/354 |
| 2006/0038769 A1 | * | 2/2006 | Marra et al. | 345/102 |
| 2006/0260923 A1 | * | 11/2006 | Lee et al. | 200/314 |

FOREIGN PATENT DOCUMENTS

| KR | 10-0651413 | 11/2006 |
|---|---|---|
| KR | 10-0651417 | 11/2006 |

* cited by examiner

*Primary Examiner* — Chanh Nguyen
*Assistant Examiner* — Ram Mistry
(74) *Attorney, Agent, or Firm* — Cha & Reiter, LLC

(57) ABSTRACT

A keypad assembly having a light leakage prevention structure includes a switch board having at least one switch; a light guide panel mounted on the switch board, light propagating inside the light guide panel; and a first light blocking member stacked on a lateral surface of the light guide panel, the first light blocking member extending to the switch board and reflecting or absorbing incident light.

15 Claims, 5 Drawing Sheets

KEYPAD ASSEMBLY HAVING LIGHT LEAKAGE PREVENTION STRUCTURE

CLAIM OF PRIORITY

This application claims priority to application entitled "Keypad Assembly Having Light Leakage Prevention Structure," filed with the Korean Intellectual Property Office on Mar. 2, 2007 and assigned Serial No. 2007-21184, the contents of which are incorporated herein by reference.

BACKGROUND OF THE INVENTION

1. Field of the Invention

The present invention relates to a keypad assembly, and more particularly to a keypad assembly having a light leakage prevention structure.

2. Description of the Related Art

Conventional keypad assemblies mounted on portable terminals include an elastic pad, a plurality of key buttons formed on the upper surface of the elastic pad, a plurality of protrusions formed on the lower surface of the elastic pad, and a plurality of light emitting devices for lighting the key buttons. Another type of conventional keypad assemblies for portable terminals include a light guide panel, light emitting devices for coupling light into the light guide panel, and key buttons illuminated by light extracted from the light guide panel.

Portable terminals typically have a keypad assembly mounted inside their case and key buttons exposed to the case so that users can operate them for desired inputs. The conventional portable terminals having these construction have a problem in that, although the key buttons alone are supposed to be illuminated, light tends to leak between the case and the keypad assembly (i.e. light leakage occurs).

Therefore, there is a need to provide a keypad assembly for a portable terminal, which has a structure configured to prevent the light leakage.

SUMMARY OF THE INVENTION

Accordingly, the present invention has been made to solve the above-mentioned problems occurring in the prior art and provides additional advantages, by providing a keypad assembly capable of preventing light leakage in an efficient manner.

In order to accomplish this aspect of the present invention, a keypad assembly having a light leakage prevention structure includes a switch board having at least one switch; a light guide panel mounted on the switch board, light propagating inside the light guide panel; and a first light blocking member stacked on a lateral surface of the light guide panel, the first light blocking member extending to the switch board and reflecting or absorbing incident light.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE INVENTION

Hereinafter, exemplary embodiments of the present invention will be described in detail with reference to the accompanying drawings. For the purposes of clarity and simplicity, a detailed description of known functions and configurations incorporated herein is omitted to avoid making the subject matter of the present invention unclear.

Figure 1:
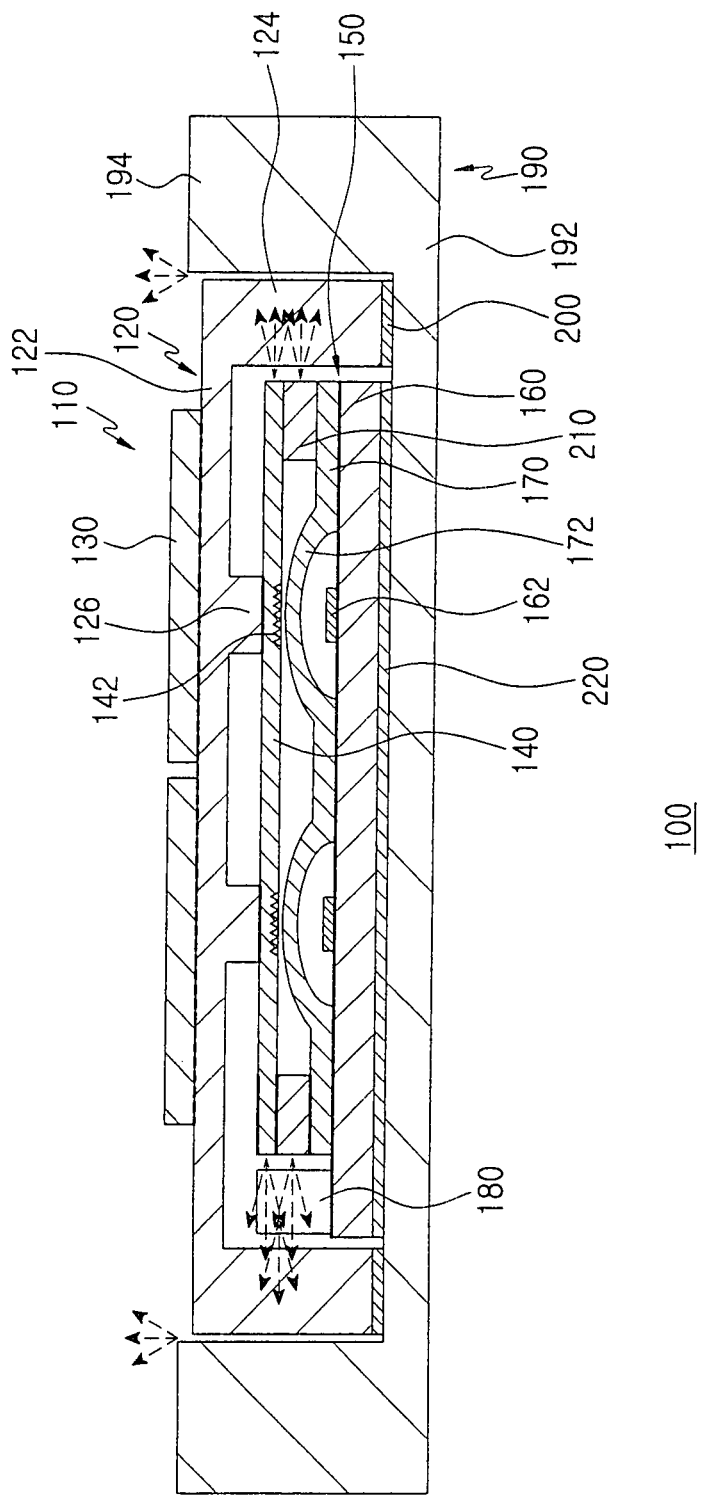
FIG. 1 is a sectional view showing a portable terminal according to a comparative embodiment of the present invention.

FIG. 1 is a sectional view showing a portable terminal according to a comparative embodiment of the present invention. As shown, the portable terminal 100 includes a case 190 and a keypad assembly 110 mounted on the case 190.

The case 190 or housing having an upward opening includes a base 192 and a side wall 194 extending upwards (or vertically) from the edge of the base 192.

The keypad assembly 110 is mounted inside the case 190. The keypad assembly 110 includes a switch board 150, a backlight unit 140, 180 having a light guide panel 140 and light emitting devices 180 mounted on the switch board 150, and a key sheet 120 positioned to cover the switch board 150 and the backlight unit 140, 180.

The switch board 150 includes a printed circuit board (PCB) 160 and a dome sheet 170.

The PCB 160 is attached to the base 192 of the case 190 by a double-sided tape 220. The PCB 160 has conductive contact members 162 formed on its upper surface so as to provide electrical contacts.

The dome sheet 170 is stacked on the upper surface of the PCB 160 and has semi-spherical conductive domes 172 for providing electrical contacts. Respective domes 172 completely cover corresponding contact members 162. As a result, each pair of a contact member 162 and the corresponding dome 172 constitute a switch 162, 172. In addition, each switch 162, 172 is aligned with a corresponding key button 130 in the transverse direction of the keypad assembly 110. When one of the domes 172 is pressed by a key input operation of the user, it makes contact with the corresponding contact member 162.

The light guide panel 140 is mounted on the upper surface of the dome sheet 170 via a support member 210 so as to guide the coupled light inside of it. The coupled light propagates from the first lateral surface of the light guide panel 140 to its second lateral surface. As used herein, the first lateral surface of the light guide panel 140 refers to one of its lateral surfaces to which light is coupled from the outside. The light guide panel 140 may have any shape, such as a square. Once being coupled to the inside of the light guide panel 140, light undergoes a total internal reflection at the interface between the light guide panel 140 and its external air layer, and propagates into the light guide panel 140. The light guide panel 140 has elasticity, which gives it self-restoring capability, so that it can regain its original shape after being defined by the user's key input operation.

The light guide panel 140 is made of a high-transparency polymer having low hardness, high elastic deformability, high elastic restoring capability, and low optical transmittance, and it should be permanently deformed by repeated operations. Preferably, the light guide panel 140 is made of polycarbonate, PMMA (polymethylmethacrylate), polyurethane, or silicone.

The light guide panel 140 preferably has a small thickness, particularly 0.1-0.3 mm, in order to render the portable terminal 100 slim. When the light guide panel 140 is made of polycarbonate or PMMA, for example, it may have a thickness of 0.1-0.2 mm. When the light guide panel 140 is made of polyurethane or silicone, it may have a thickness of 0.1-0.3 mm.

The support member 210 may have the shape of a closed ring, for example a square strip, and is attached to the light guide panel 140 and the dome sheet 170. The support member 210 is attached to the edge or interior of the light guide panel 140, and may consist of double-sided tape, an adhesive, or a sticky printed layer.

The light guide panel 140 has a plurality of light extraction patterns 142, each of which extract a fraction of light, which propagates into the light guide panel 140, to outside of the light guide panel 140 so that it is incident on the corresponding key button 130. When the light extracting patterns 142 are formed on the lower surface of the light guide panel 140, as shown, they reflect at least a part of the incident light towards corresponding key buttons 130, respectively. This reflection may be mirror reflection or scattering (diffuse) reflection. If necessary, the light extracting patterns 142 may be formed on the upper surface of the light guide panel 140. In this case, the light extracting patterns 142 transmit incident light towards corresponding key buttons 130, respectively.

As shown in FIG. 1, light propagating into the light guide panel 140 after total internal reflection is incident on the light extracting patterns 142, and the majority of light reflected towards the key buttons 130 by the light extracting patterns 142 propagate to the outside through the light guide panel 140 and the key sheet 120 because it fails to satisfy the total reflection condition (i.e. the incident angle is smaller than the critical angle). In addition, light undergoing no reflection at the light extracting patterns 142 and a portion of the reflected light satisfy the total reflection condition. As a result, they keep propagating inside the light guide panel 140 and contribute to lighting of other key buttons.

The light extracting patterns 142 may consist of at least one V-shaped body formed on the upper surface of the light guide panel 140, i.e. indentations or protrusions having a V-shaped cross section. Alternatively, the light extracting patterns 142 may consist of a plurality of indentations or protrusions having the shape of pyramids. When the light extracting patterns 142 are V-shaped bodies, they may extend from a lateral surface of the light guide panel 140 to another lateral surface lying opposite it. The V-shaped bodies may have the shape of saw teeth, which may be varied according to design requirements. In addition, the light extracting patterns 142 may be indentations formed on the upper surface of the light guide panel 140 in various shapes, or a plurality of protrusions formed on the same. For example, the light extracting patterns 142 may consist of a plurality of indentations or protrusions, each of which has the shape of a semi-sphere, a triangular pyramid, etc. If necessary, the light extracting patterns 142 may be reflecting or scattering patterns formed by scratching or printing.

As light inside the light guide panel 140 propagates from the first lateral surface, which is adjacent to the light emitting devices 180, to the second lateral surface while undergoing attenuation, the distribution of luminance appearing over the keypad assembly 110 may gradually weaken from the first lateral surface of the light guide panel 140 to its second lateral surface. In order to avoid such irregularity of luminance, it is possible to gradually increase the density of the light extracting patterns 142 from the first lateral surface of the light guide panel 140 to its second lateral surface while the overall pattern size remains the same. Such a change in density of the light extracting patterns 142 may be made by varying their number or size. The density of the light extracting patterns 142 is defined as the area occupied by the light extracting patterns 142 per unit area. Alternatively, the size of the light extracting patterns 142 may gradually increase from the first lateral surface of the light guide panel 140 to its second lateral surface. When the light extracting patterns 142 are V-shaped bodies, their density is defined as the peak interval of the V-shaped bodies, and the peak density may gradually decrease from the first lateral surface of the light guide panel 140 to its second lateral surface.

The light emitting devices 180 are mounted on the upper surface of the PCB 160 so that their light emitting surface faces the first lateral surface of the light guide panel 140. Light from the light emitting devices 180 is coupled to the inside of the light guide panel 140 via its first lateral surface. The light emitting devices 180 may consist of conventional LEDs (Light Emitting Diodes).

The key sheet 120 is positioned so as to cover the switch board 150. The key sheet 120 includes an elastic portion 122, a support portion 124, key buttons 130, and protrusions 126. The key sheet 120 is made of high-transparency rubber having low hardness, high elastic deformability, high elastic restoring capability, and high optical transmittance so as to provide a good clicking feel, suppress interference between the key buttons 130 (i.e. when one of the key buttons 130 is pressed, a plurality of switches, not a single one corresponding to the pressed key button 130, may be undesirably operated), and prevent a permanent deformation resulting from repeated operations. Preferably, the key sheet 120 is made of polyurethane or silicone.

The key sheet 120 has the shape of a box having a downward opening, i.e. it has an inner containing space. The support portion 124 extends downwards (or vertically) from the edge of the elastic portion 122. The lower end of the support portion 124 is attached to the base surface of the case 190, i.e. to the upper surface of the base 192 of the case 190 by an adhesive. The backlight unit 140, 180 and the switch board 150 are mounted in the containing space of the key sheet 120.

Alternatively, the key sheet 120 may have an approximately planar shape as in the case of conventional key sheets. In this case, the key sheet 120 may not include the support portion 124, but only the elastic portion 122, the key buttons 130, and the protrusions 126.

The key buttons 130 are formed on the upper surface of the elastic portion 122, and have characters, numerals, etc. printed on their upper surface, respectively. The key buttons 130 may be attached to the upper surface of the elastic portion 122 by an adhesive, or constitute an integral unit with the elastic portion 122. The key buttons 130 may be made of the same material as the elastic portion 122. For example, the key buttons 130 may be made of polycarbonate or acrylic resin. The key buttons 130 may have any shape, such as a circular post or an elliptical post. The elastic portion 122 has elasticity, which gives it self-restoring capability, so that, after being defined by the user's key input operation, it can regain its original shape.

The protrusions 126 are formed on the lower surface of the elastic portion 122. The protrusions 126 may be made of the same material as the elastic protrusion 122 so as to constitute an integral unit with it. Alternatively, the protrusions 126 may be separately formed and then attached to the lower surface of the elastic portion 122. The protrusions 126 may have any shape, such as a truncated cone or a trapezoidal hexahedron. The protrusions 126 are aligned with corresponding key buttons 130 in the transverse direction of the keypad assembly 110. As shown, the key buttons 130, the protrusions 126, the light extracting patterns 142, and the switches 162, 172 are aligned with one another in the transverse direction of the keypad assembly 110.

When the user activates one of the key buttons 130, the corresponding protrusion 126, which is aligned with the pressed key button 130, compresses a portion of the light guide panel 140, on which a light extracting pattern 142 is formed and aligned with the protrusion 126. The deformed portion of the light guide panel 140 compresses a switch 162, 172 aligned with the light extracting pattern 142. Here, the portable terminal 100 is vulnerable to a light leakage. A portion of light from the light emitting devices 180 is coupled to the light guide panel 140, and another portion thereof propagates through a space between the light guide panel 140 and the dome sheet 170.

Figure 2:
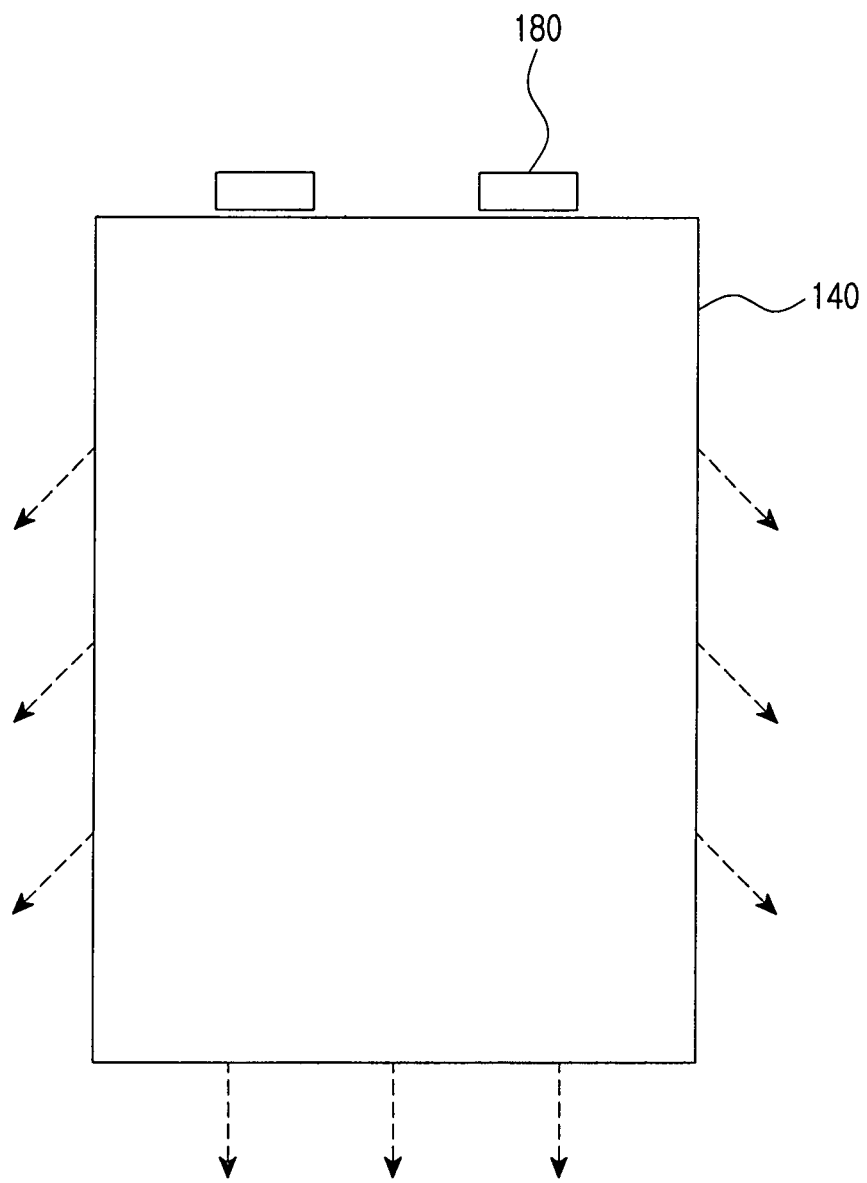
FIG. 2 shows light leaking out through lateral surfaces of a light guide panel shown in FIG. 1.

FIG. 2 shows light leaking out through lateral surfaces of the light guide panel 140. A portion light propagating inside the light guide panel 140 is not extracted to the external environment by the light extracting patterns 142, and such residual light reaches the lateral surfaces of the light guide panel 140. Here, the majority of the residual light incident on the lateral surfaces leaks out. When the leaking light leaks again through the gap between the keypad assembly 110 and the case 190, the light leakage occurs.

The light propagating through the space between the light guide panel 140 and the dome sheet 170 also leaks through the gap between the keypad assembly 110 and the case 190, thus causing a light leakage.

Furthermore, light emitted by the light emitting devices 180 in a direction opposite to the light guide panel 140, as well as light reflected by the light guide panel 140 and the support member 210 leak through the gap between the keypad assembly 110 and the case 190, thus results in light leakage.

Figure 3:
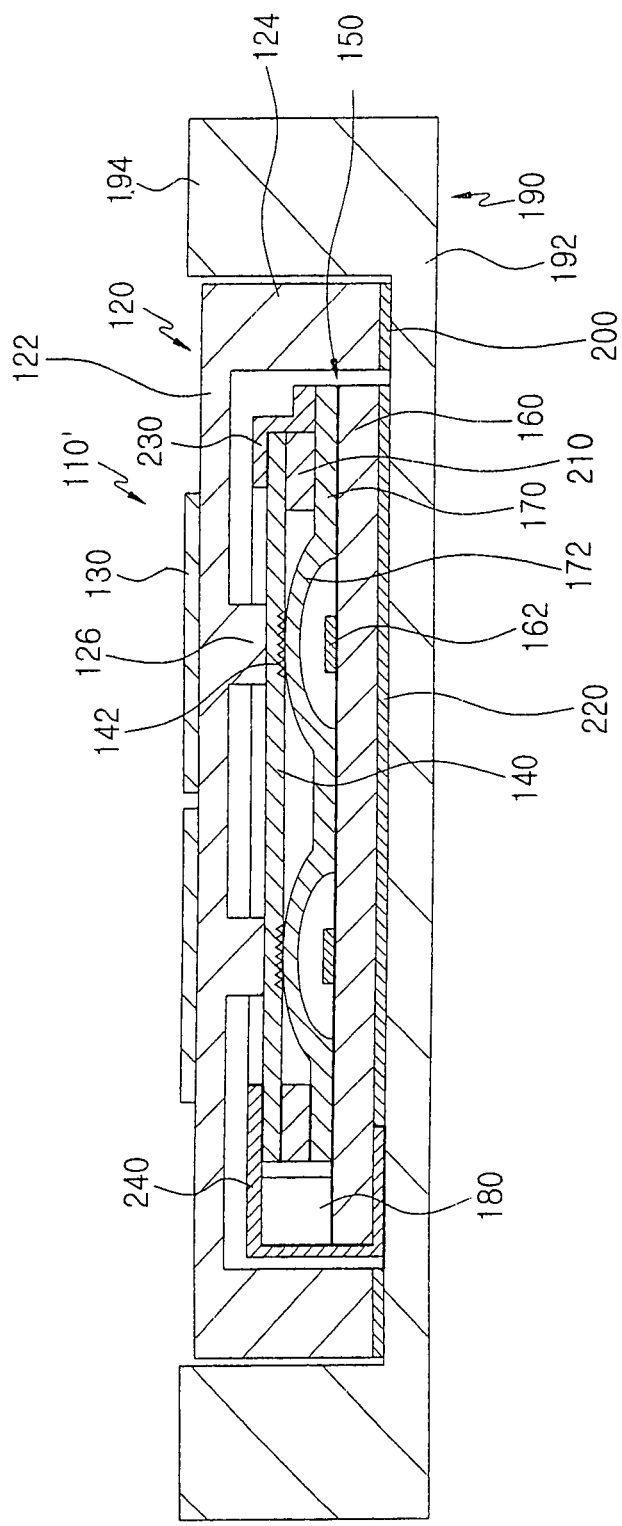
FIG. 3 is a sectional view showing a portable terminal according to an exemplary embodiment of the present invention.

FIG. 3 is a sectional view showing a portable terminal according to an exemplary embodiment of the present invention. As shown, the portable terminal 100' has the same construction as that of the portable terminal 100 shown in FIG. 1, except that it further includes first and second light blocking members 230 and 240. Therefore, the following description will be focused on the first and second light blocking members 230 and 240, and descriptions of the same components will be omitted to avoid redundancy.

Figure 4:
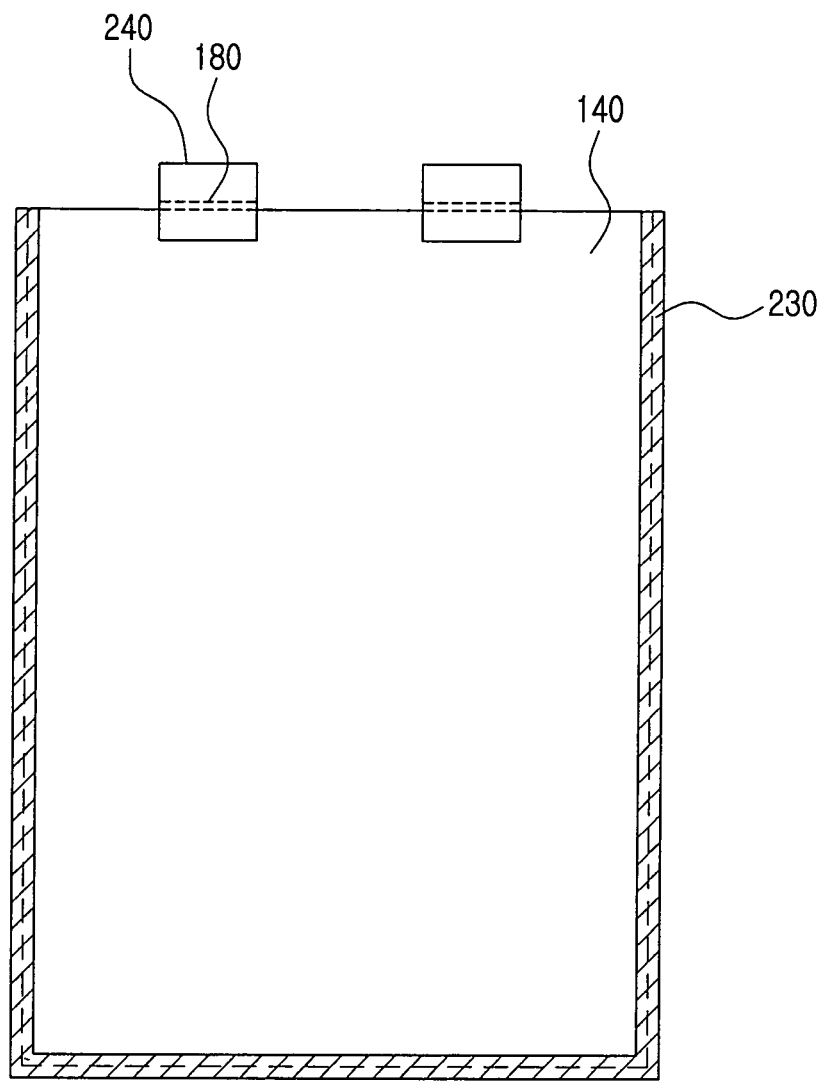
FIG. 4 is a top view showing a light guide panel and first and second blocking members show in FIG. 3.
Figure 5:
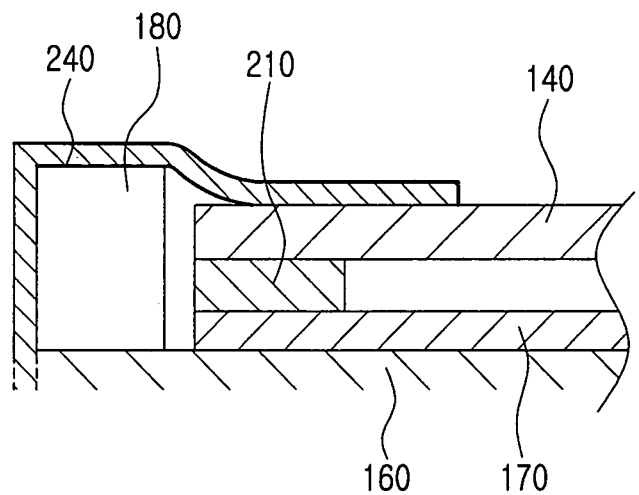
FIG. 5 is a sectional view partially showing one end of a keypad assembly shown in FIG. 3.
Figure 6:
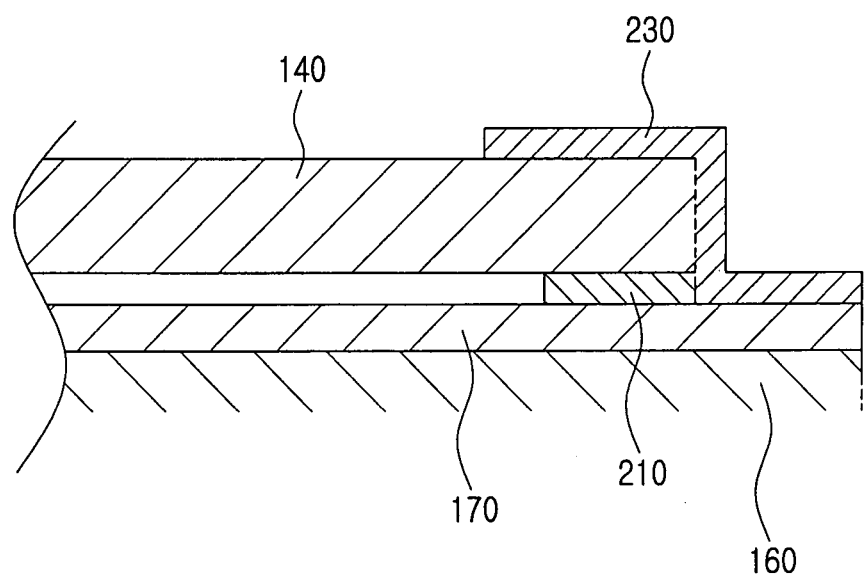
FIG. 6 is a sectional view partially showing the other end of the keypad assembly shown in FIG. 3.

FIG. 4 is a top view showing a light guide panel 140 and first and second blocking members 230 and 240. FIG. 5 is a sectional view partially showing one end of a keypad assembly 110' (including the first lateral surface of the light guide panel 140). FIG. 6 is a sectional view partially showing the other end of the keypad assembly 110' (including the second lateral surface of the light guide panel 140).

Referring to FIG. 4, the first light blocking member 230 is stacked on a lateral surface of the light guide panel 140, and extends through the lateral surface of the support member 210 up to the upper surface of the dome sheet 170. The first light blocking member 230 is stacked on at least the second lateral surface of the light guide panel 140. Preferably, the first light blocking member 230 is stacked on four lateral surfaces of the light guide panel 140 (including the second lateral surface), except for the first lateral surface, continuously (or discontinuously, if necessary).

As shown in FIG. 4, the first light blocking member 230 may have the shape of a U-shaped strip. If necessary, both ends of the first light blocking member, which has a U-shaped strip portion, may extend up to the light emitting devices.

Particularly, the first light blocking member 230 may be stacked on the four lateral surfaces of the light guide panel 140 (including the second lateral surface), except for the first lateral surface, and on a part of the first lateral surface continuously (or discontinuously, if necessary).

Referring to FIG. 6, the first light blocking member 230 may be formed through a printing process. A single-layered printing process, for example, employs light blocking ink (e.g. black ink) having a high optical absorbability or reflective ink (e.g. metal ink or white ink) having a high optical reflectivity. In the case of a double-layered printing process, reflective ink having a high optical reflectivity is used for primary printing, and light blocking ink having a high optical absorbability is applied on the reflective ink for secondary printing. Particularly, the first light blocking member 230 may consist of either a reflection layer or an absorption layer. Alternatively, the first light blocking member 230 consists of a reflection layer and an absorption layer stacked on it. In the latter case, the absorption layer absorbs light that has passed through the reflection layer.

Referring to FIG. 5, the second light blocking member 240 is attached to cover the upper surface of the light emitting devices 180, as well as their rear surface, which lies opposite their front surface acting as the light emitting surface. One end of the second light blocking member 240 extends up to the upper surface of the light guide panel 140 and attaches to it, and the other end thereof extends up to the lower surface of the PCB 160 and attaches to it. The second light blocking member 240 may consist of conventional single-sided or double-sided light blocking tape so that it absorbs or reflects incident light. Preferably, the second light blocking member 240 consists of single-sided light blocking tape having a color (e.g. black or red) for absorbing or reflecting incident light.

As described above, the keypad assembly according to the present invention is advantageous in that the first light blocking member blocks light leaking through the lateral surfaces of the light guide panel. This prevents light leakage in an efficient manner. In addition, the second light blocking member blocks light leaking towards the light emitting devices. This prevents light leakage in an efficient manner.

While the invention has been shown and described with reference to certain exemplary embodiments thereof, it will be understood by those skilled in the art that various changes in form and details may be made therein without departing from the spirit and scope of the invention as defined by the appended claims.

What is claimed is:
1. A keypad assembly comprising:
   a switch board having at least one switch;
   a light guide panel mounted on the switch board and comprising contiguous upper and lower surfaces that has a constant level of reflectivity and extends along a length of the switch board, the upper surface of the light guide panel being flat throughout its entire length along an upper surface of the switch board, the light guide panel propagating light through an inside of the light guide panel and undergoing total internal reflection at each of the upper and lower surfaces of the light guide panel being in direct contact with an air layer;
   a light emitting device facing a second lateral surface of the light guide panel, the light emitting device coupling light to an inside of the light guide panel;
   a first light blocking member directly stacked on a first lateral surface of the light guide panel, the first light blocking member extending to the switch board and reflecting or absorbing incident light; and a second light blocking member directly stacked on the light emitting device and absorb incident light leaking toward the light emitting device, wherein the light guide panel includes a light extraction pattern arranged over said at least one switch and below a key button to change an incident angle of a portion of the light being propagated through the light guide panel and contacting the light extraction pattern to be smaller than a critical angle of total internal reflectivity and project out of the light guide panel and illuminate the key button;

wherein light undergoes total internal reflection throughout an entire length of the light guide panel along the upper surface of the switch board except for the portion of the light contacting the light extraction pattern; and wherein the first light blocking member is continuously stacked on lateral surfaces of the light guide panel except for the second lateral surface so that the first light blocking member has a U-shaped strip along the lateral surfaces of the light guide panel.

2. The keypad assembly as claimed in claim 1, wherein the switch board comprises a PCB and a dome sheet stacked on the PCB, the dome sheet having conductive domes, and the first light blocking member extends to a surface of the dome sheet.

3. The keypad assembly as claimed in claim 1, wherein the first light blocking member comprises a single absorption layer for absorbing incident light.

4. The keypad assembly as claimed in claim 1, wherein the first light blocking member comprises a reflection layer for reflecting incident light and an absorption layer for absorbing light passing through the reflection layer.

5. The keypad assembly as claimed in claim 1, further comprising a key sheet disposed to fully cover upper and side surfaces of the switch board, the light guide panel and the light emitting device, wherein the key sheet comprises the key button formed on an upper surface of the key sheet and a protrusion formed on a lower surface of the key sheet, the key button and the protrusion being arranged directly over said at least one switch.

6. The keypad assembly as claimed in claim 1, wherein the switch board includes a printed circuit board (PCB) having a plurality of contact members and a dome sheet disposed on the upper surface of the PCB.

7. The keypad assembly as claimed in claim 6, wherein the dome sheet has conductive domes for providing electrical contacts, so that each of the domes completely covers the corresponding contact members.

8. The keypad assembly as claimed in claim 1, wherein the first light blocking member is formed through a single-layered printing process.

9. The keypad assembly as claimed in claim 1, wherein the first light blocking member is formed through a double-layered printing process.

10. The keypad assembly as claimed in claim 1, wherein the first light blocking member consists of a reflection layer and an absorption layer stacked on the reflection layer.

11. The keypad assembly as claimed in claim 1, wherein the second light blocking member consists of a single-sided or double-sided light blocking tape so that it absorbs incident light.

12. The keypad assembly as claimed in claim 11, wherein the single-sided light blocking tape has black or red color for absorbing incident light.

13. The keypad assembly as claimed in claim 1, wherein the light guide panel is arranged directly over said at least one switch.

14. The keypad assembly as claimed in claim 1, wherein the light guide panel comprises a high transparency polymer.

15. The keypad assembly as claimed in claim 1, wherein the lower surface of the light guide panel is flat throughout the entire length of the light guide panel so that the light guide panel has a uniform thickness between the upper and lower surfaces of the light guide panel, and the light extraction pattern is arranged over and in alignment with said at least one switch.

* * * * *